E. K. BULLOCK,
Assignor, by mesne assignments, to L. M. BULLOCK & H. PENNOCK.
Corset.
No. 9,778. Reissued June 28, 1881.
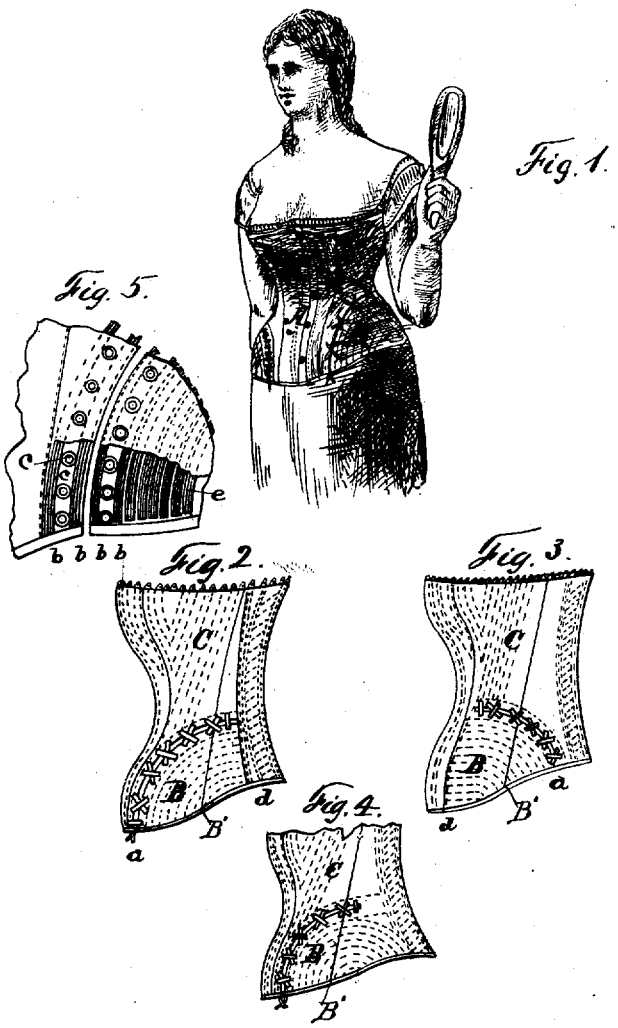
WITNESSES.
S. E. Thomas
Fred Q. Paige.
E. Hoyl Bullock INVENTOR.
By W. W. Leggett
ATTORNEY.
N. PETERS, Photo-Lithographer, Washington, D. C.

UNITED STATES PATENT OFFICE.

E. KOYL BULLOCK, OF DETROIT, MICHIGAN, ASSIGNOR, BY MESNE ASSIGNMENTS, TO LYDIA M. BULLOCK, OF SAME PLACE, AND HOMER PENNOCK, OF NEW YORK, N. Y.

CORSET.

SPECIFICATION forming part of Reissued Letters Patent No. 9,778, dated June 28, 1881.

Original No. 221,393, dated November 11, 1879. Application for reissue filed February 11, 1881.

*To all whom it may concern:*

Be it known that I, E. KOYL BULLOCK, of Detroit, in the county of Wayne and State of Michigan, have invented a new a useful Improvement in Corsets; and I do hereby declare that the following is a full, clear, and exact description of the construction and operation of the same, reference being had to the drawings hereto annexed, making a part of this specification, and to the letters and figures of reference marked thereon.

Figure 1 of the drawings is a representation of the upper portion of a female with my improved corset in position. Fig. 2 is a side view of the corset. Fig. 3 is a side view of the corset, showing a modification of the curved slit. Fig. 4 is a portion of a corset, showing the semicircular stays in the hip-piece. Fig. 5 is a detail view, showing the stays more fully.

This invention relates to that class of corsets having adjustable hip-pieces; and the object of the improvement is to draw the laced portions down upon the hips to prevent the lower edges of the corset from puckering, and at the same time leave that portion of the corset over the hip-bones smooth, so that a graceful sloping form shall be given to the hips of the wearer.

It is a well-known fact that corsets are worn by ladies for the purpose of improving their figures.

Heretofore the hip portions of the corset have been provided with vertical or straight slits, and adjusted by means of lacing directly over the hip-bones, and consequently left an unsmooth surface.

My improvement is designed to overcome these difficulties; and therefore it consists in so constructing the lower portion of each half of the corset with a quadrant-shaped piece with lacing means.

It also consists in the quadrant-shaped pieces provided with correspondingly-shaped stays or whalebones arranged in a proper manner in the pieces, so as to conform to the outlines or contour of the hip; and it also consists in the novel construction and arrangement of the parts, as will be hereinafter set forth.

In the annexed drawings, forming a part of this specification, the letter A represents a corset composed of two halves, which are united by the ordinary lacing behind, and by any ordinary fastening in front.

In the manufacture of the corsets, which is in the usual way, the side portion of each half is cut at the lower end, commencing at the front, near the busk, and extending rearwardly in a curve to a point under or beyond the arms, completing the quarter of a circle, or nearly so. That portion of the now quadrant-shaped piece B between the letters *a d* remains a part and parcel of the corset-half C, substantially as indicated in the drawings.

The curved edge of the quadrant-shaped piece and the curved edge of the corset-body are strengthened by the double row of curved stays or whalebones *b*.

Between the double row of curved stays are arranged at suitable intervals, eyelets *c*, to receive a lacing.

That portion of the corset on the shape of a quadrant or the quarter of a circle is filled at suitable intervals with curved stays, *e*, corresponding substantially with the piece in which they are secured. These stays are usually made of whalebones, and are shaped by any suitable means, so as to readily conform to the outlines of the hips when the corset is adjusted to the wearer.

It will be observed that the stays all start from the lower edge of the corset and follow the curve of the quadrant-shaped pieces, the objects of which are to obtain firmness, a smooth surface over the hip-bones, and fullness of figure.

The size and shape of the lower portion of the corset may be varied by tightening or loosening the lacings, and the graceful sloping of the hips is accomplished by adjusting the quadrant-shaped pieces over the hip-bones and tightening the lacings at the lower ends of the curved slits, which draws the parts together closely, and gives greater convexity to the parts of the body called "hips."

In lieu of the stays in the quadrant-shaped pieces a strong fabric of double thickness may be substituted, to secure firmness and elasticity.

In Fig. 3 of the drawings the curved slit is shown extending from right to left, whereas in the other figures the curved slit is shown running from left to right. Fig. 4 of the drawings shows the stays of a semicircular form. Therefore I do not confine myself to the precise arrangement or construction herein described, as slight changes may be made without departing from the spirit of the invention. From the curved lower edge of the main portion of the corset a line, B′, extends down over the hip, and is denominated the "hip-line."

What I claim is—

1. A corset having quadrant-shaped hip-pieces, provided with stays extending on lines which curve over from the front of the hip toward the rear, substantially as described.

2. A corset having a quadrant-shaped piece back of the hip-line, provided with stays extending in curved lines from the hip-line, over and downward to the lower edge of the corset, substantially as described.

3. The combination, in a corset, of a hip-piece with a series of stays extending from its lower front edge upward and backward to the hip-line, and a series of stays extending from its lower rear edge upward and forward to the hip-line, substantially as described.

4. A corset having its hip portion or piece provided with stays arranged in curved lines which extend from the lower front edge upward and backward over the hip, and downward to the back lower edge of the piece or portion, substantially as described.

5. A corset having a quadrant-shaped portion at the front of the hip-line and a quadrant-shaped portion at the rear of the hip-line, both of said portions boned with parallel and adjacent stays which unite along the hip-line, substantially as described.

6. A corset having quadrant-shaped hip-pieces adapted to be adjusted and laced over the hip of the wearer, substantially as described.

7. A corset having quadrant-shaped hip-pieces fitted with stays corresponding with the shape of the hip-pieces, said quadrant-shaped pieces with stays capable of being adjusted and laced over the hips of the wearer, substantially as described.

8. The combination, in a corset, of the body-half having a curved portion strengthened by stays and provided with lacing means, and a quadrant-shaped hip-piece provided with lacing means, substantially as and for the purpose set forth.

9. A corset of the class described, consisting substantially of the following elements, to wit: the body having a curved portion describing the quadrant of a circle, or nearly so, and provided with a plurality of eyelets, a quadrant-shaped piece forming a part of the corset-body and provided with a plurality of eyelets and a lacing for adjusting the parts together, substantially as described.

In testimony whereof I sign this specification in the presence of two witnesses.

E. KOYL BULLOCK.

Witnesses:
HENRY T. QUELCH,
WILLIAM LOOK.